United States Patent Office 3,129,257
Patented Apr. 14, 1964

3,129,257
NOVEL SULFONYLHYDRAZONES OF CYCLIC HALOVINYL ALDEHYDES
Leo A. Paquette, Portage Township, Kalamazoo County, Mich., assignor to The Upjohn Company, Kalamazoo, Mich., a corporation of Delaware
No Drawing. Filed Feb. 12, 1963, Ser. No. 257,864
3 Claims. (Cl. 260—556)

This invention relates to novel compositions of matter and to methods of preparing the same. It is particularly directed to novel sulfonylhydrazones of cyclic halovinyl aldehydes and to processes for the preparation of the same.

The novel compounds of the invention have the following formulas:

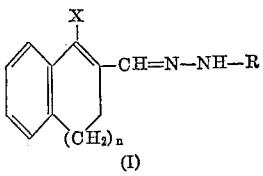

and

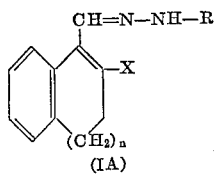

wherein X is selected from the group consisting of chlorine and bromine, $n$ is an integer of 1 to 2, and R is selected from the group consisting of loweralkanesulfonyl, benzenesulfonyl, and loweralkylbenzenesulfonyl.

The novel compounds of the invention are prepared by reacting a cyclic halovinyl aldehyde selected from the group consisting of compounds having the formulas:

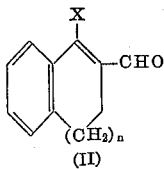

and

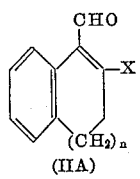

wherein X and $n$ are as given above, with a sulfonic acid hydrazide of the formula $H_2N$—$NH$—$R$ wherein R is as given above.

Advantageously, the reaction between the cyclic halovinyl aldehyde of Formula II or IIA and the sulfonic acid hydrazide of formula $H_2N$—$NH$—$R$ is carried out in the presence of an inert solvent, e.g., methanol, ethanol, propanol, butanol, benzene, toluene, and the like. Stoichiometrically the reaction requires equimolar amounts of the aldehyde and the sulfonic acid hydrazide, although an excess of either reactant can be employed if so desired. Preferably, the aldehyde and the sulfonic acid hydrazide are employed in molar ratios varying from about 1:1.5 to 1.5:1. The reaction can be carried out over a wide range of temperature, preferably between about 0° C. and about 125° C., and more particularly between about 20° C. and about 100° C. In many instances, it is very convenient to carry out the reaction at the reflux temperature of the inert solvent. The time required for completing the reaction will of course depend on the temperature at which the reaction is conducted and the reactivity of the particular reactants; generally speaking, reaction times varying from about 1 hour to about 6 hours suffice. Upon completion of the reaction, the desired sulfonylhydrazone of Formula I or IA can be isolated and purified by conventional procedures, e.g., filtration of the reaction mixture followed by recrystallization of the product thus obtained.

The cyclic halovinyl aldehydes of Formula II can be prepared by reacting 3,4-dihydro-1(2H)-naphthalenone (α-tetralone) or 6,7,8,9-tetrahydro-5H-cycloheptabenzen-5-one (benzsuberone) with a formylating agent consisting of dimethylformamide and a phosphorus halide such as phosphorus oxychloride or phosphorus oxybromide. See Ziegenbein et al., Chem. Ber. 93, 2743, 1960. The cyclic halovinyl aldehydes of Formula IIA can be prepared in the same manner, starting with 3,4-dihydro-2(1H)-naphthalenone (β-tetralone) or 5,7,8,9-tetrahydro-6H-cycloheptabenzen-6-one (Page et al., J. Am. Chem. Soc. 75, 2053, 1953).

The sulfonic acid hydrazides of formula $H_2N$—$NH$—$R$ can be prepared by reacting hydrazine with a sulfonyl halide. For example, the loweralkanesulfonic acid hydrazides can be prepared by reacting hydrazine hydrate with a loweralkylsulfonyl chloride according to the process of Newcombe, Can. J. Chem. 33, 1250, 1955.

The novel compounds of the invention have central nervous system depressant activity and anti-inflammatory activity and can be used for effecting sedation or allaying inflammation in mammals, birds, and other animals. They also cause decrease in weight gain, food efficiency, body fat, epididymal fat pads, and water intake in these animals and can be used for weight control. They also have antifertility activity.

The novel compounds of the invention are nitrogenous acids and as such can exist in both the protonated and nonprotonated forms according to the pH of the environment. The nonprotonated forms can be isolated as the alkali metal or alkaline earth metal salts which are useful in upgrading the free acids, that is, the protonated form. Suitable base metals for this purpose include sodium, potassium, lithium, calcium, barium, and strontium. The salts can be formed by neutralizing the free acid with the appropriate base or by metathesis.

The invention may be more fully understood by reference to the following illustrative examples in which the parts and percentages are by weight unless otherwise specified.

EXAMPLE 1

*1-Chloro-3,4-Dihydro-2-Naphthaldehyde p-Tolylsulfonyl-hydrazone*

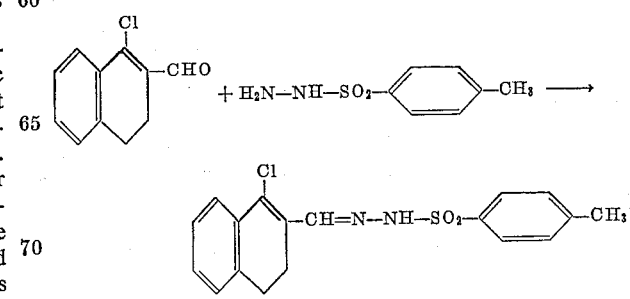

A solution of 20.7 g. (0.10 mole) of 1-chloro-3,4-dihydro-2-naphthaldehyde and 17.0 g. (0.10 mole) of p-toluenesulfonic acid hydrazide in 150 ml. of ethanol was refluxed for 3 hours. The solvent was removed under reduced pressure and the residue was crystallized by adding a small amount of ether and scratching. After drying there was obtained 31.2 g. of yellow solid, M.P. 169–170° C. (dec.). Two recrystallizations of this material from ethanol gave pure 1-chloro-3,4-dihydro-2-naphthaldehyde p-tolylsulfonylhydrazone as yellow prisms, M.P. 175–176° C.

Analysis.—Calcd. for $C_{18}H_{17}ClN_2O_2S$: C, 59.91; H, 4.75; N, 7.76; Cl, 9.83. Found: C, 59.94; H, 4.95; N, 7.59; Cl, 9.58.

EXAMPLE 2

*9-Chloro-6,7-Dihydro-5H-Benzocycloheptene-8-Carboxaldehyde p-Tolylsulfonylhydrazone*

Following the procedure of Example 1, substituting the 1-chloro-3,4-dihydro-2-naphthaldehyde by 9-chloro-6,7-dihydro - 5H - benzocycloheptene-8-carboxaldehyde, there was obtained 9-chloro-6,7-dihydro-5H-benzocycloheptene-8-carboxaldehyde p-tolylsulfonylhydrazone.

EXAMPLE 3

By substituting 1-bromo-3,4-dihydro-2-naphthaldehyde and 9 - bromo - 6,7-dihydro-5H-benzocycloheptene-8-carboxaldehyde for the corresponding chloro aldehydes of Examples 1 and 2, the p-tolylsulfonylhydrazones of these bromo aldehydes are obtained.

By substituting the p-toluenesulfonic acid hydrazide in the foregoing examples by methanesulfonic acid hydrazide and other loweralkanesulfonic acid hydrazides, for example, ethane-, propane-, butane-, pentane-, hexane-, heptane-, and octanesulfonic acid hydrazides, including the isomeric forms thereof; benzenesulfonic acid hydrazide; and other loweralkylbenzenesulfonic acid hydrazides, for example, o- and m-toluenesulfonic acid hydrazides, 3,5-dimethylbenzenesulfonic acid hydrazide, p-ethylbenzenesulfonic acid hydrazide, p-isopropylbenzenesulfonic acid hydrazide, and p-butylbenzenesulfonic acid hydrazide, there are obtained the corresponding sulfonylhydrazones of 1-chloro- and 1-bromo-3,4-dihydro-2-naphthaldehydes and 9-chloro- and 9-bromo-6,7-dihydro-5H-benzocycloheptene-8-carboxaldehydes.

EXAMPLE 4

*2-Chloro-3,4-Dihydro-1-Naphthaldehyde p-Tolylsulfonylhydrazone*

A. 2-CHLORO-3,4-DIHYDRO-1-NAPHTHALDEHYDE

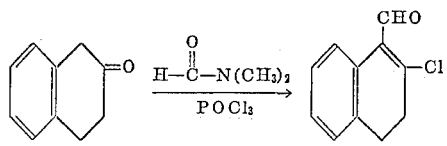

To a stirred solution of 30 g. of dimethylformamide in 100 ml. of trichloroethylene cooled in an ice bath was added 53 g. (0.346 mole) of phosphorus oxychloride below 10° C. When the addition was complete, the ice bath was removed and the mixture was stirred at room temperature for 0.5 hour. A solution of 50 g. (0.342 mole) of β-tetralone in 75 ml. of trichloroethylene was added below 60° C. with rapid stirring. The solution was stirred at 50–60° C. for 4 hr., cooled and to it was cautiously added a solution of 125 g. of sodium acetate in 375 ml. of water. The layers were separated and the aqueous layer was extracted with diethyl ether. The combined organic layers were dried, filtered, and evaporated. The residue was distilled to give 29.0 g. of colorless liquid which rapidly darkened (red), B.P. 150–155° C. (15 mm.). This material, 2-chloro-3,4-dihydro-1-naphthaldehyde, soon solidified to a white solid (pink supernatant on standing).

B. 2-CHLORO-3,4-DIHYDRO-1-NAPHTHALDEHYDE p-TOLYLSULFONYLHYDRAZONE

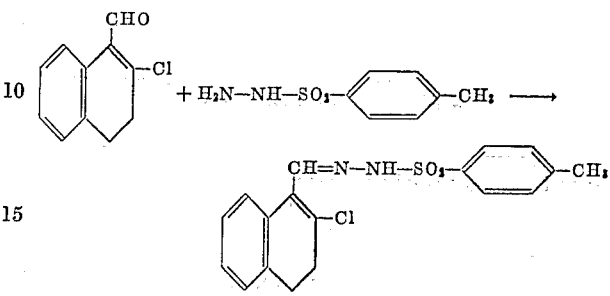

A solution of 7.0 g. (0.0368 mole) of the aldehyde of part A and 6.3 g. (0.037 mole) p-toluenesulfonic acid hydrazide in 50 ml. of ethanol was refluxed for 2 hours. Water was added to the hot ethanolic solution to the cloud point and the solution was cooled. The crystals were filtered and dried to give 11.3 g. of yellow solid, M.P. 163–166° C.

Recrystallization from ethanol-water and then from ethanol gave pure 2-chloro-3,4-dihydro-1-naphthaldehyde p-tolylsulfonylhydrazone as fluffy white needles, M.P. 171–172° C. (dec.).

Analysis.—Calcd. for $C_{18}H_{17}ClN_2O_2S$: C, 59.91; H, 4.75; N, 7.76; Cl, 9.93. Found: C, 59.85; H, 4.49; N, 7.75; Cl, 10.15.

EXAMPLE 5

*8-Chloro-6,7-Dihydro-5H-Benzocycloheptene-9-Carboxaldehyde p-Tolylsulfonylhydrazone*

Following the procedure of Example 4, substituting the β-tetralone by 5,7,8,9-tetrahydro-6H-cycloheptabenzen-6-one, there was obtained 8-chloro-6,7-dihydro-5H-benzocycloheptene-9-carboxaldehyde and its p-tolylsulfonylhydrazone.

By substituting the phosphorus oxychloride in Examples 4 and 5 by phosphorus oxybromide, the corresponding bromo compounds are obtained.

By substituting the p-toluenesulfonic acid hydrazide in Examples 4 and 5 by methanesulfonic acid hydrazide and the other loweralkanesulfonic acid hydrazides listed above, benzenesulfonic acid hydrazide, and the other loweralkylbenzenesulfonic acid hydrazides listed above, there are obtained the corresponding sulfonylhydrazones of 2-chloro- and 2-bromo-3,4-dihydro-1-naphthaldehydes and 8-chloro- and 8-bromo-6,7-dihydro-5H-benzocycloheptene-9-carboxaldehydes.

I claim:

1. A compound selected from the group consisting of (1) compounds of the formula:

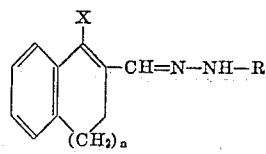

(I)

and compounds of the formula:

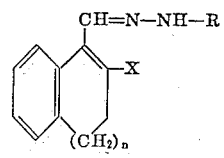

(IA)

wherein X is selected from the group consisting of chlorine and bromine, $n$ is an integer of 1 to 2, and R is selected from the group consisting of loweralkanesulfonyl, benzenesulfonyl, and loweralkylbenzenesulfonyl, and (2) the alkali metal and alkaline earth metal salts thereof.

2. 1 - chloro - 3,4 - dihydro - 2 - naphthaldehyde p-tolylsulfonylhydrazone.

3. 2 - chloro - 3,4 - dihydro - 1 - naphthaldehyde p-tolylsulfonylhydrazone.

References Cited in the file of this patent

Chemical Abstracts, vol. 52, pp. 10982 (1958).
German application, G17239 IVG120, Oct. 11, 1956.